US012472430B2

(12) United States Patent
Marshall et al.

(10) Patent No.: US 12,472,430 B2
(45) Date of Patent: Nov. 18, 2025

(54) METHOD, SYSTEM AND COMPUTER PROGRAM FOR RENDERING A GAMEPLAY SEQUENCE IN A GRAPHICAL USER INTERFACE OF A COMPUTER DEVICE

(71) Applicant: PUSH GAMING PRODUCT LIMITED, Sliema (MT)

(72) Inventors: James Robert Marshall, Sliema (MT); Konstantinos Vytsaras, Sliema (MT)

(73) Assignee: PUSH GAMING PRODUCT LIMITED, Sliema (MT)

( * ) Notice: Subject to any disclaimer, the term of this patent is extended or adjusted under 35 U.S.C. 154(b) by 279 days.

(21) Appl. No.: 18/133,686

(22) Filed: Apr. 12, 2023

(65) Prior Publication Data

US 2023/0321540 A1 Oct. 12, 2023

(30) Foreign Application Priority Data

Apr. 12, 2022 (GB) ...................................... 2205396

(51) Int. Cl.
*A63F 13/537* (2014.01)

(52) U.S. Cl.
CPC .................................. *A63F 13/537* (2014.09)

(58) Field of Classification Search
CPC ...................................................... A63F 13/537
See application file for complete search history.

(56) References Cited

U.S. PATENT DOCUMENTS 5,769,716 A * 6/1998 Saffari ................ G07F 17/3265 463/20
6,093,104 A * 7/2000 Kasahara ................ A63F 13/44 463/9
7,144,322 B2 * 12/2006 Gomez ................... G07F 17/32 463/16
7,690,985 B1 * 4/2010 Muskin ................... G07F 17/34 463/19
8,133,111 B2 * 3/2012 Thomas .............. G07F 17/3211 463/20
8,366,538 B1 * 2/2013 Saunders .............. G07F 17/326 463/31

(Continued)

OTHER PUBLICATIONS

International Search Report and Written Opinion for International Application No. PCT/EP2023/059557, mailed Jun. 22, 2023.

(Continued)

*Primary Examiner* — Steve Rowland
(74) *Attorney, Agent, or Firm* — Wolf, Greenfield & Sacks, P.C.

(57) ABSTRACT

A computer game is rendered in a graphical user interface. A set-up view is rendered for selecting one or more game lanes from a set of game lanes. User input is received for selecting one of more one or more game lanes of the set of game lanes. A game initiation input is received, and a gameplay sequence is rendered by randomly populating each game lane with game blocks, until a termination condition is met, based on at least one block generation probability associated with the game lane. Upon termination of the gameplay sequence, a gameplay outcome is determined dependent on whether any selected game lane has reached a threshold number of game blocks.

17 Claims, 13 Drawing Sheets

(56) References Cited

U.S. PATENT DOCUMENTS

| | | | | |
|---|---|---|---|---|
| 2004/0023714 | A1* | 2/2004 | Asdale | G07F 17/32 463/22 |
| 2009/0118004 | A1* | 5/2009 | Hoffman | G07F 17/3248 463/31 |
| 2009/0137309 | A1* | 5/2009 | Thomas | G07F 17/3211 463/20 |
| 2010/0004050 | A1* | 1/2010 | Caputo | G07F 17/3265 463/20 |
| 2011/0045906 | A1* | 2/2011 | Berman | G07F 17/3202 463/43 |
| 2011/0053675 | A1* | 3/2011 | Aoki | G07F 17/3211 463/20 |
| 2011/0086695 | A1* | 4/2011 | Evans | G07F 17/32 463/43 |
| 2013/0072286 | A1* | 3/2013 | Suda | G07F 17/3267 463/20 |
| 2014/0235338 | A1* | 8/2014 | Hansson | A63F 13/533 463/31 |
| 2015/0087382 | A1* | 3/2015 | Gilbertson | G07F 17/326 463/20 |
| 2017/0092049 | A1* | 3/2017 | Bolling, Jr. | G07F 17/3244 |
| 2018/0286183 | A1* | 10/2018 | Davis | G07F 17/34 |
| 2019/0304246 | A1* | 10/2019 | Bolling | G07F 17/3251 |
| 2019/0325693 | A1* | 10/2019 | McLeneghan | G07F 17/3213 |
| 2020/0111294 | A1* | 4/2020 | Halvorson | G07F 17/3213 |
| 2021/0110635 | A1* | 4/2021 | Yost | G07F 17/3258 |
| 2021/0241570 | A1 | 8/2021 | Robinson | |
| 2022/0068081 | A1 | 3/2022 | Pariseau | |
| 2023/0033113 | A1* | 2/2023 | Penacho | G07F 17/3211 |

OTHER PUBLICATIONS

PCT/EP20223/059557, Jun. 22, 2023, International Search Report and Written Opinion.

* cited by examiner 30
40
36b
18

32a
36a
34
32b
14b
30
38

METHOD, SYSTEM AND COMPUTER PROGRAM FOR RENDERING A GAMEPLAY SEQUENCE IN A GRAPHICAL USER INTERFACE OF A COMPUTER DEVICE

TECHNICAL FIELD

The present disclosure pertains to methods of rendering a gameplay sequence in a graphical user interface, and computer programs and systems for implementing the same.

BACKGROUND

A computer game may be implemented based on an underlying set of game rules. For a given set of game rules, there may be many possible technical implementations with different benefits and drawbacks. A computer game may be realized by way of an interactive graphical user interface (GUI). It is important that the GUI is constructed in a way that renders the game playable and engaging, whilst respecting the underling game rules.

SUMMARY

Herein, a computer game mechanic is considered with a set of game lanes. Each game lane is randomly (probabilistically) populated with game blocks, according to some block generation probability (or probabilities). Different game lanes may be associated with different probabilities, and the aim is to select one or more game lanes that are subsequently with some threshold number game blocks (a 'win' on the game lane) when a game play sequence is subsequently initiated. Generally, a better gameplay outcome is obtained when a user wins on a game lane with a lower overall probability of a win outcome. When selecting game lanes, a user may be provided with some visual indication as to the overall probability of winning on that game lane. The implementation of such a game mechanic in a computer system presents certain technical challenges that are addressed herein.

A first aspect herein is directed to a computer-implemented method of rendering a computer game in a graphical user interface, implemented by one or more computer processors. A set-up view is rendered in the graphical user interface for selecting one or more game lanes from a set of game lanes. User input is received for selecting in the set-up view one of more one or more game lanes of the set of game lanes. A game initiation input is received. A gameplay sequence is rendered in the graphical user interface by randomly populating each game lane with game blocks, until a termination condition is met, based on at least one block generation probability associated with the game lane. Upon termination of the gameplay sequence, a gameplay outcome is determined, which is dependent on whether any game lane that was selected in the set-up view has reached a threshold number of game blocks.

Different game lanes may be associated with different block generation probabilities.

A game lane is said to be fully populated when it reaches the threshold number of game blocks. In the described embodiments, each game lane is formed of an array of N grid cells, where N is the threshold number (reached when all grid cells have been populated with game blocks). In other embodiments, a game lane may have more than N grid cells, in which case the threshold number N is reached when the game lane is populated with N or more game blocks.

Different termination conditions may be applied. In the described embodiments, the gameplay sequence is rendered based on a sequence of iterations and, for each iteration, a randomized decision is made for each game lane as to how many game blocks to add to the game lane. The termination condition is met upon completion of a final iteration in which at least one game lane has reached the threshold number of game blocks (N).

Each game lane may be formed of an ordered one-dimensional array of grid cells, and each iteration may be performed as follows. For each unpopulated grid cell of each game lane, the unpopulated grid cell may be randomly populated with one of a game block and a null element. For any grid cell that is populated with a null element, the null element is then removed from the grid cell (so that it becomes unpopulated again). For any grid cell that is populated with a game block and preceded by one or more grid cells that are now unpopulated as result of removing one or more null elements, the game block may be moved to a preceding grid cell in the one-dimensional array that is unpopulated and immediately preceded by a grid cell populated with a game block, thereby forming a single contiguous sequence of game blocks in the game lane.

In the described embodiments, the game lanes are arranged vertically, with the array running from bottom to top. When null elements are removed, any resulting spaces in the array are filled by the upper game block(s) "falling" to fill the gaps. This is merely an example, and the arrays can be arranged in any manner with any desired game physics.

To maintain an engaging gameplay experience, it would be desirable to maintain a sufficient level of activity in every game lane in the GUI. However, this is somewhat at odds with the underlying game mechanic, particularly for a game lane where the probability of a win outcome is low, implying that game blocks will be added to such game lanes relatively infrequently. Certain example embodiments provided herein address a technical implementation challenge, namely ensuring that a reasonable level of visual activity is maintained in every game lane during the game play sequence when the probability of a win outcome differs between game lanes. This can be alternatively stated as the desire to balance two potentially conflicting requirements, namely maintaining a given level of visual activity in every game lane on the one hand, and maintaining a relatively lower overall win probability for certain game lane(s) on the other. To understand the potential for conflict, it is useful to consider embodiments in which each game lane is associated with a single block generation probability; in this case, the only way to reduce the overall probability of a win is to reduce the block generation probability, which in turn necessarily reduces the level of visual activity in that lane (in terms of block generation) because blocks are generated less frequently on average.

In alternative embodiments, each game lane may alternatively be associated with at least a first block generation probability and a second block generation probability lower than the first block generation probability. Each game lane may be randomly populated based initially on the first (higher) block generation probability associated with the game lane up to an intermediate number of game blocks (also referred to as an intermediate threshold). Upon a game lane reaching or exceeding the intermediate number of game blocks, the game lane may be populated thereafter based on the second (lower) block generation probability associated with the game lane, independently of the first (higher) block generation probability associated with the game lane.

Within this framework, the first and second probabilities can be tuned to increase visual activity in a game lane, without increasing the overall probability of a win: by increasing the first probability, blocks will be generated more frequently on average up to the intermediate threshold, with the result of increasing the visual activity in the game lane (in terms of block generation) up to that point; in turn, the second probability can be reduced to compensate for the increase in the first probability, such that the overall probability of a win outcome is unchanged.

Each game lane may be randomly populated initially based on the first block generation probability independently of the second block generation probability. For example, in the described embodiments, every unpopulated grid cell in a game lane is initially populated with a game block or a null element based on the first block generation probability (that is, the first probability is used for all unpopulated grid cells initially). Once the intermediate threshold has been reached, this triggers a switch, and from that point, the second block generation probability is used for all remaining unpopulated grid cells.

Whilst the described embodiments consider two probabilities only by way of example, such embodiments may be implemented with more than two lane generation probabilities, e.g. with multiple intermediate thresholds triggering multiple changes in the block generation probability.

In embodiments, each unpopulated grid cell of each game lane may be populated with a game block or a null element in an initial iteration based on the first block generation probability associated with the game lane. In each subsequent iteration, each unpopulated grid cell of each game lane may be populated with a game block or a null element based on:

- the first block generation probability associated with the game lane, independently of the second block generation probability associated therewith, in the event the game lane did not reach the intermediate number of blocks in the preceding iteration, and
- the second block generation probability associated with the game lane, independently of the first block generation probability associated therewith, in the event the game lane reached or exceeded the threshold number of game blocks in the preceding iteration.

For any game lane that has not reached the intermediate number of game blocks, all unpopulated grid cells of the game lane may be populated substantially simultaneously with game blocks, null elements or a combination of game blocks and null elements. For any game lane that has reached the intermediate number of game blocks, the game lane may be randomly populated by deciding whether to populate each unpopulated grid cell of the game lane with a game block or a null element, with the decision regarding one grid cell affecting the timing of the population of one or more other grid cells. For example, if it is decided to populate the earliest unpopulated grid cell with a game block, that grid cell may be populated with a game block on the graphical user interface before populating any other grid cell of that game lane. However, if it is decided to populate the earliest unpopulated grid cell with a null element, that grid cell may instead be populated with a null element on the graphical user interface substantially simultaneously with populating the next grid cell with a game block or null element in the GUI.

The aforementioned features have the effect of 'slowing down' the game play sequence as the termination condition as approached, thus providing intuitive visual feedback to the user as to the time remaining in the game.

The set-up view may comprise, for at least a subset of the set of game lanes, a multiplier indicator associated with the game lane. A game lane may be selected by associating a user-defined token amount with the game lane, the token amount being deducted from a token balance of the computer game. Determining the game outcome may comprise computing a win amount based on a multiplier value and the user-defined token amount associated with any selected game lane that has reached the threshold number of game blocks.

The multiplier indicator may indicate a minimum multiplier value for the game lane. Responsive to the game initiation input and prior to the gameplay sequence, at least one grid cell in at least one game lane of the subset of game lanes may be randomly populated with a modification element. For any game lane that is populated with at least one modification element, the multiplier value may be determined based on the minimum multiplier value and a value of the at least one modification element (modifier value). For any game lane that is not populated with any modification element, the multiplier value may be set to the minimum multiplier value indicated in the set-up view.

The modifier elements could, for example, be multiplicative (the minimum multiplier value is multiplied by the modifier valuer to obtain a final multiplier value for the game lane) or additive (the minimum multiplier value is added to the modifier valuer to obtain the final multiplier).

A block generation probability associated with each game lane may inversely related to the minimum multiplier associated with the game lane (which is to say that block generation probability generally decreases as the minimum multiple value increases).

At least one bonus game lane may be rendered on the GUI. If the bonus game lane has reached the threshold number of game blocks when the termination condition is met, a further gameplay sequence may be initiated in response thereto, and the gameplay outcome may be dependent on an outcome of the further gameplay sequence and whether any selected game lane has reached the threshold number of game blocks.

The bonus game lane may be selectable in the same way as the set of game lanes. In that case. initiation of the further gameplay sequence is additionally dependent on the bonus lane having been selected in the set-up view.

Further aspects herein provide a computer system comprising one or more computer processors configured to implement the method of the first aspect or any embodiment thereof, and a computer program stored on non-transitory media and configured, when executed on one or more computer processors, to implement the same.

BRIEF DESCRIPTION OF FIGURES

Particular embodiments of the present disclosure will now be described by way of example only, with reference to the following illustrative figures, in which.

DETAILED DESCRIPTION

Figure 1:
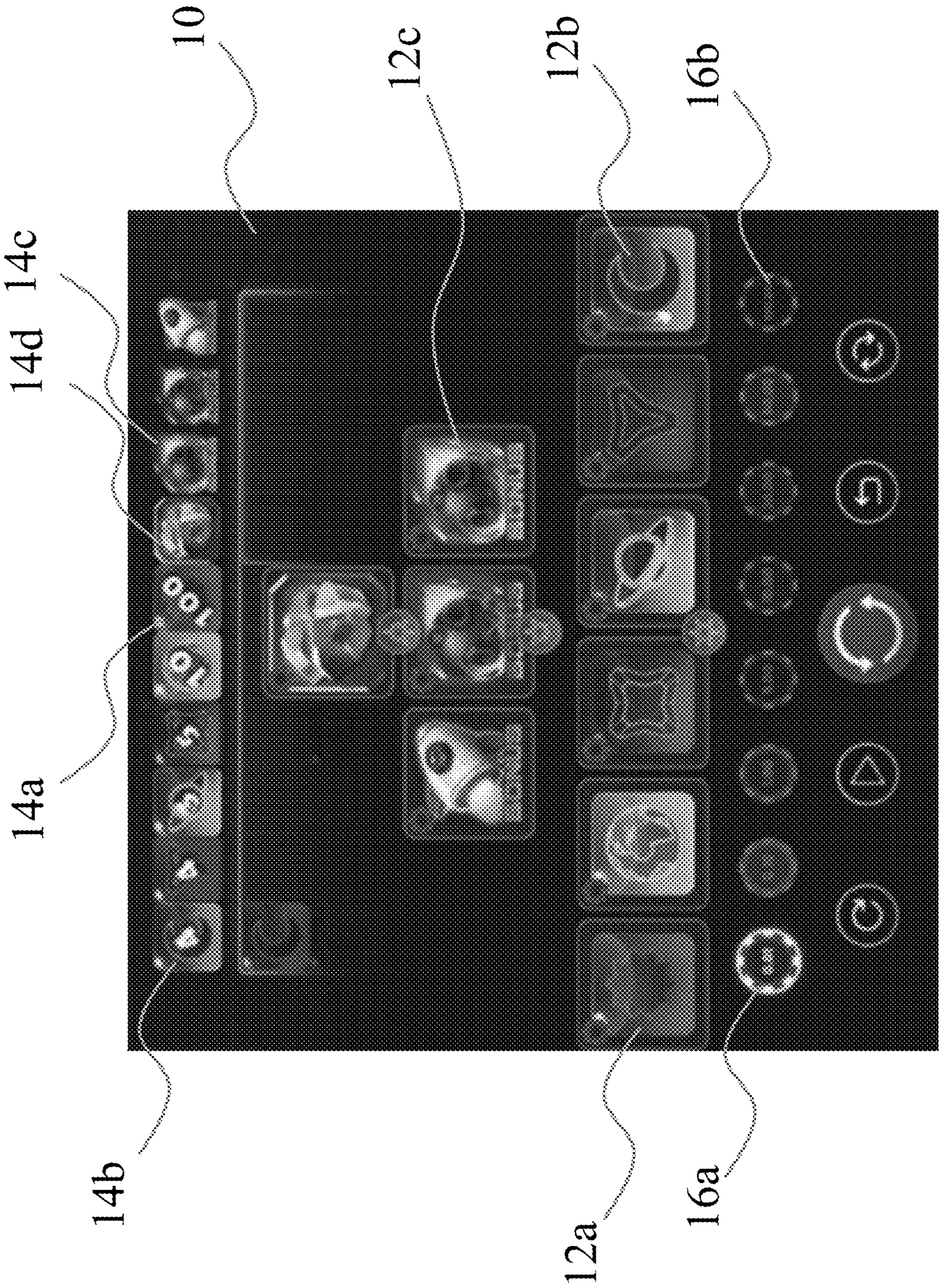
FIG. 1 shows an exemplary pre-game user interface, using which a user may select a bet amount and place one or more bet.

A novel form of game mechanic is considered herein based on randomized population of multiple "game lanes". A game is rendered on a graphical user interface of a computer device in two phases. In a setup phase, a user selects one or more of the game lanes. Upon finalizing the selection, a gameplay sequence is instantiated, in which each game lane is populated with game blocks based on a block generation probability. In some cases, multiple block generation probabilities may be applied to a given game lane over the course of a game play sequence (see below). The block generation probability is generally different for different game lanes. In the setup phase, the user is provided with an indication of the block generation probability for each lane, for example by way of a "multiplier" (or minimum multiplier-see below) that generally increases as the probability of block generation decreases (or more generally as the overall probability of a win outcome on a given lane decreases). The game lanes are populated in an iterative fashion. In a given iteration, every game lane is updated in the sense that a decision is made for every game lane as to the number of game blocks added to that game lane in that iteration (which could be zero as the decision is probabilistic). If any game lane becomes fully populated in a given iteration, the gameplay sequence terminates at the end of that iteration (all game blocks are considered in the final iteration, and this could result in multiple game lanes becoming fully populated in the final iteration).

A win is generated in the event a user has selected a game lane that is fully populated with game tiles. Win events are generated independently between game lanes (a user can win on one lane and lose on another at the end of a given game play sequence). A user's game account is associated with a token balance, and the user selects a game lane by associating a quantity of tokens (deducted from the token balance) with the game lane. A win event causes the token balance to be increased by a value demined from the lane multiplier and the quantity of tokens the user has associated with that lane. Absent a win event on a given lane, the quantity of tokens associated with that lane is permanently deducted from the token balance. One or more 'bonus' lanes may be provided, which trigger a further game play sequence in the event of a bonus lane being fully populated when the gameplay sequence terminates.

The implementation of the game mechanic presents in a computerized gameplay system presents various technical challenges that are set out in detail below. Firstly, further details of the game interface are described by way of context.

The following description details exemplary embodiments of a game implemented on a computing device. FIGS. 1-10 show a plurality of user interface views, via which a user may select one or more game lane, select to instigate a gameplay sequence, and watch an engaging graphical animation that reveals the outcome of the gameplay sequence, and the outcome of the user's bet.

FIG. 1 shows an exemplary pre-game user interface (UI) 10 of a computer implemented game. The UI 10 may be used to configure a bet in the game. The UI 10 comprises a plurality of prize elements 12, each one of the plurality of prize elements being visually distinct on the UI. FIG. 1 shows ten exemplary prize elements, though it will be appreciated that a different number may be provided. For clarity, only three prize elements are labelled in FIG. 1. Reference numerals 12*a*, 12*b* and 12*c* respectively denote a "red star" prize element, a "blue moon" prize element, and an "asteroid" element. Each prize element 12 on the UI 10 may be a selectable feature which, when selected, places a bet on a particular outcome of a gameplay sequence. The particular outcome on which the user bets is represented by the corresponding selected prize element 12. Note that a user may select one or more (including all) prize elements. However, in cases where a user selects and 'bets' on a plurality of prize elements, the user is not betting that those prize elements will win in combination. The user is betting on each prize element's associated outcome separately. A bet on a lane refers generally of quantity of tokens associated with the lane based on an available token balance. The terminology does not necessarily imply monetary value; for example, the tokens could simply be points that are awarded to the user within the gameplay environment.

Note that the computer-implemented game described herein may allow more than one outcome to be realised in a single gameplay sequence, which means the total number of possible gameplay sequence outcomes may be far greater than the number of distinct prize elements 12 on which a bet can be placed. The term "winning prize element" may be used herein to refer to a selected prize element 12 whose associated outcome is realised in a gameplay sequence, either independently or in combination with one or more other prize element.

The UI 10 further comprises a plurality of multiplier blocks 14. Each multiplier block is associated with a corresponding prize element 12 and may be visually similar to the prize element to which it corresponds. In the example of FIG. 1, multiplier block 14*a* corresponds to prize element 12*a*, multiplier block 14*b* corresponds to prize element 12*b*, and multiplier block 14*c* corresponds to prize element 12*c*.

Each multiplier block 14 may include a number. A number displayed on a particular multiplier block may indicate a factor by which the user's bet is multiplied if a user places a bet on the corresponding prize element and the selected prize element is a winning prize element. In the example of FIG. 1, multiplier block 14*a* is visually similar to its corresponding prize element 12*a*, but further includes a number "4", indicating that a bet placed on prize element 12*a* would return 4*x* the bet amount if prize element 12*a* were a winning prize element. Similarly, multiplier block 14*b* includes a number "100", indicating that a bet placed on prize element 12*b* would return 100*x* the bet amount if prize element 12*b* were a winning prize element.

In the example of FIG. 1, four of the displayed multiplier blocks 14 do not include a number; multiplier block 14*c*, for example. Multiplied blocks 14 which do not display a number may be associated with a more complex system of scaling bets placed on corresponding prize elements. However, for the purposes of this description, it will be appreciated that if prize element 12*c* were a winning prize element, user selection of the prize element 12*c* may be returned according to some arbitrary scaling factor associated with the multiplier block 14*c*. Note that the description of FIGS. 3-10 is focused on simple multiplicative bet returns, rather than "bonus" multipliers such as block 14*c*. Nevertheless, it will be appreciated that game lanes associated with "bonus" prize elements may return a prize according to a multiplier (arbitrary scaling factor) or may provide an "instant win".

A plurality of bet size buttons 16 are shown on the UI 10 of FIG. 1. Eight exemplary bet size buttons 16 are shown on the UI, but for clarity only two, 16*a*, 16*b*, are labelled. Each bet size icon 16 may be selectable to configure quantity of tokens (which may be of a real or in-game currency, as discussed later herein) that is to be bet on a later-selected prize element 12. For example, selection of bet size button 16*a* sets the bet amount to 0.01 token units. Subsequent selection of a prize element 12 may therefore configure a bet of 0.01 token units on the selected prize element. The UI 10 may provide a visual indication of which bet size button is active by darkening non-selected bet size buttons 16. For example, in FIG. 1, bet size button 16*a* is active and is shown to be brighter on the UI 10 than bet size button 16*b*, which is shown to be darker. Upon selection of a non-selected bet-size button, the newly selected button 16 may appear lighter, and the previously selected button darker, indicating that a new bet size (corresponding to the newly selected bet size button 16) is configured. In some embodiments, compound bets, made of two or more constituent bet sizes, may be configurable. In such an example, a plurality of bet size buttons may be simultaneously active, and a user may select an already activated bet size-button 16 to deactivate it, and vice versa. For example, a user may activate bet size buttons 16*a* and 16*b* to configure a bet of 100.01 token units.

Figure 2:
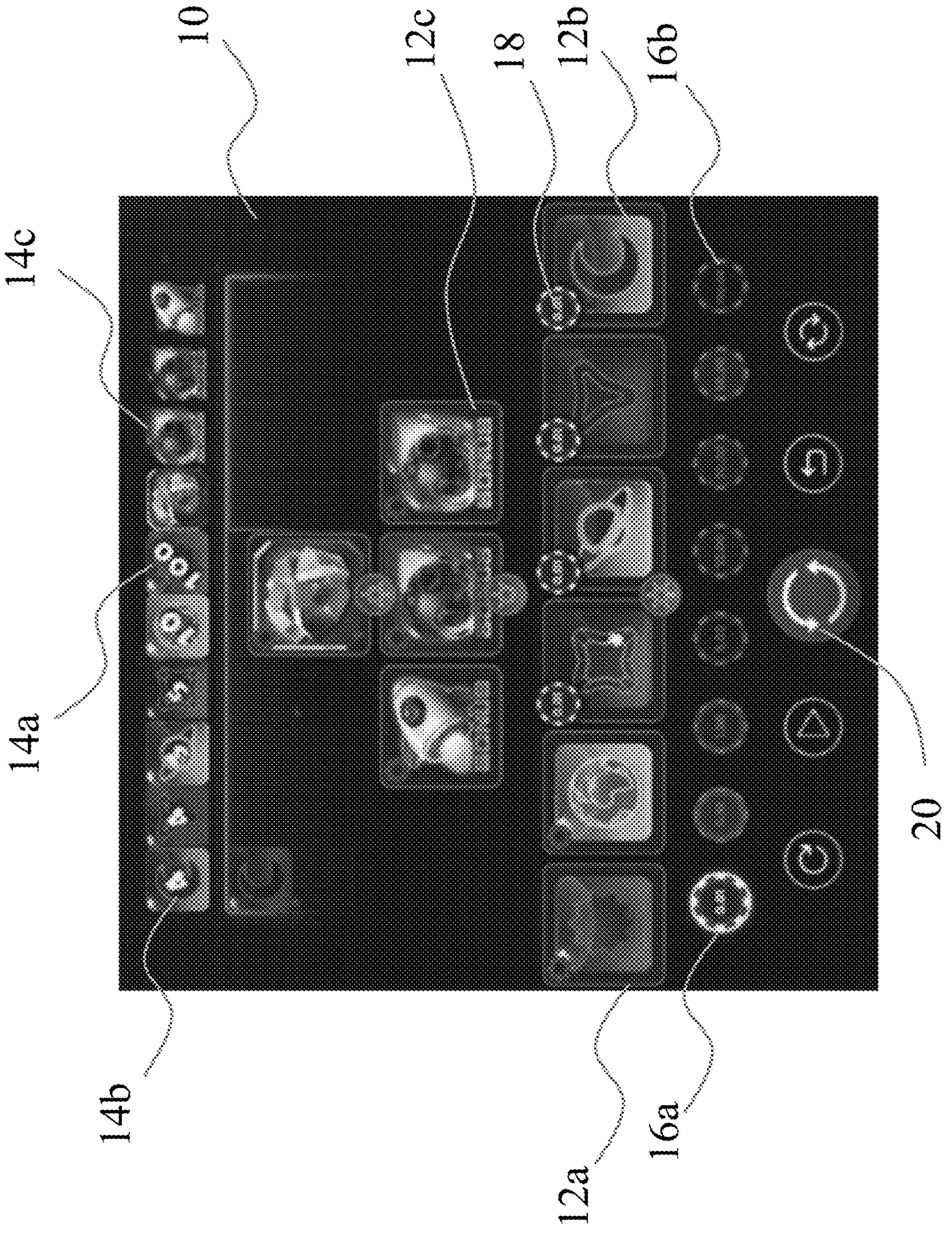
FIG. 2 shows the same exemplary user interface as in FIG. 1, wherein the user has made a bet by selected a plurality of game blocks.

FIG. 2 shows the same pre-game user interface 10 as is shown in FIG. 1, including the same prize elements 12 and multiplier blocks 14. In the example of FIG. 2, the user has selected bet size button 16*a*, and has placed a 0.01 unit bet on four of the ten prize elements 12. Each of the selected prize elements 12 include an active bet indicator 18. An active bet indicator 18 is a graphical icon or symbol overlaid on a prize element 12 to indicate that that prize element has been selected and a bet has been placed on it.

FIG. 2 also shows a selectable "spin" button 20. When the user has configured a bet using the selectable prize elements 12 and bet size buttons 16, the play button 20 may be selected to begin a bet spin sequence, in which the outcome of the bet is revealed.

Figures 3A, 3B:
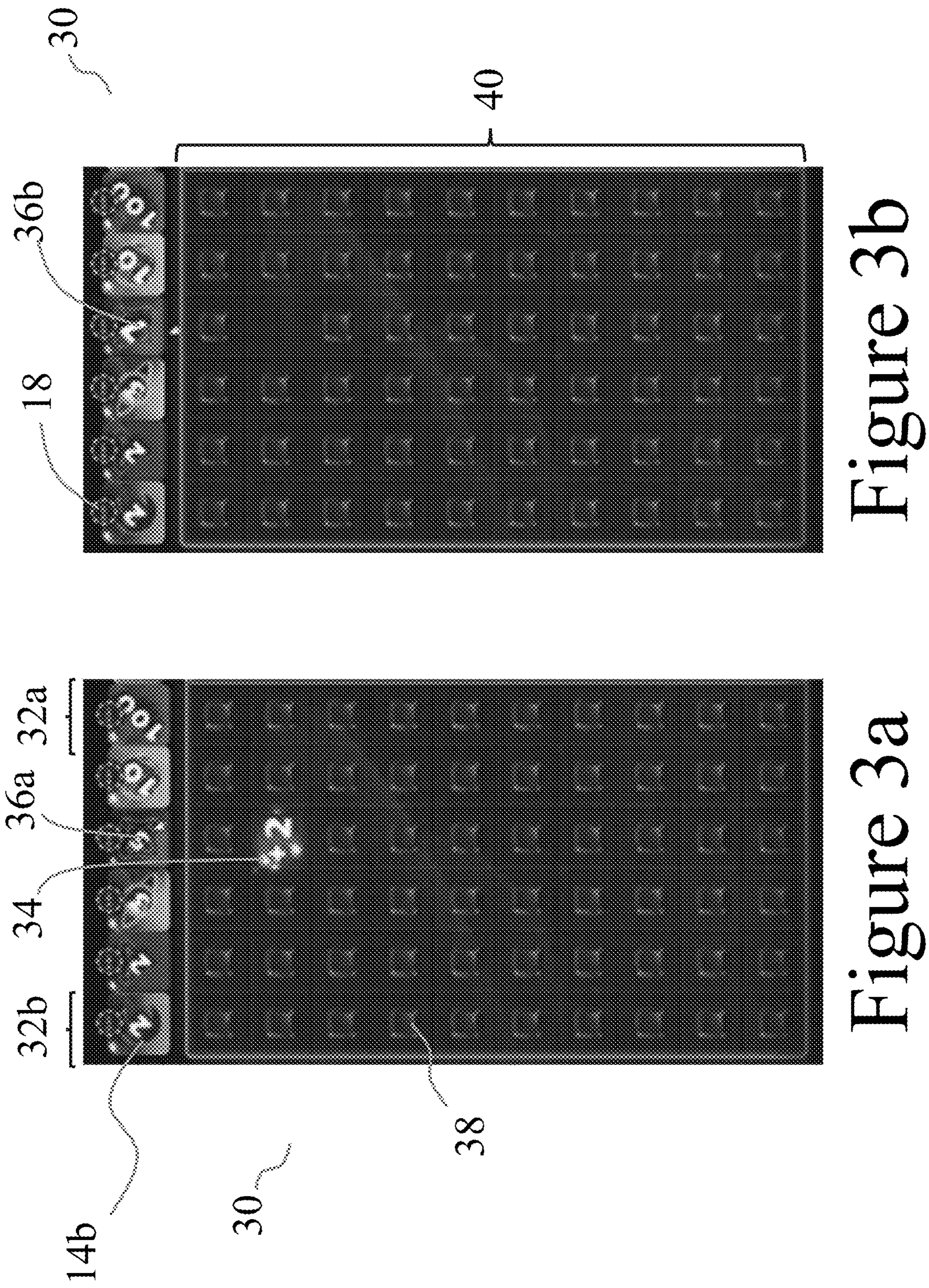
FIG. 3*a* shows an in-game user interface displaying an initiation event of a gameplay sequence.
FIG. 3*b* shows the same in-game user interface as FIG. 3*a*, wherein a multiplier modifying element is applied to a corresponding game lane.

Reference is now made to FIGS. 3*a* and 3*b*. The outcome of a user bet is visualised in a gameplay sequence. At the highest level, a gameplay sequence as described herein involves a game grid 40 separated into game lanes 32, each game lane having an array of vertically orientated game 'tiles' (grid cells). The game grid is displayed on an in-game UI 30 on a computing device. In the examples of FIGS. 3-9, each game lane 32 includes ten game tiles, though other embodiments may have different numbers thereof. The number of game lanes 32 in a game grid 40 corresponds exactly to the number of distinct prize elements 12 that are provided to be betted on, as each distinct prize element 12 is represented by a separate game lane 32 on the game grid 40. Multiplier blocks 14 corresponding to each prize element 12 are displayed above the game grid 40, directly above their associated game lane 32, indicating which game lane corresponds to which prize element 12. For example, note that game lane 32*a* and 32*b* are respectively associated with multiplier blocks 14*a* and 14*b*. Note that an active bet indicator 18 may be provided on multiplier blocks 14 corresponding to prize elements on which the user has placed a bet. In FIG. 3*a*, the user has placed a bet on all prize elements 12.

During a gameplay sequence, game elements 12 of each type are generated in their corresponding game lanes 32. Prize elements 12 (game blocks) may be generated until at least one game lane 32 is full of its corresponding prize element 12 type; that one or more corresponding prize element 12 is then a winning prize element. If a user placed a bet on a winning prize element, the user receives a return on their bet according to the multiplier associated with that prize element. The number of prize elements 12 generated in each column may be based on (or more generally related to) the factor by which a bet is multiplied if the corresponding element is a winning prize element. That is, the likelihood of generation of an element 12 in a particular game lane 32 may be inversely proportional or otherwise inversely related to the multiplier value associated with the particular game lane 32. This way, bets which stand to make a large return (high multiplier) are less likely to be realised than those with smaller returns.

A gameplay sequence may comprise one or more phase or sub-sequence, where prize elements 12 may be generated differently in different phases. FIGS. 3*a* and 3*b* show an exemplary initiation event in which multiplier block values may be changed. In an initiation event, a plurality of null blocks 38 are generated on the game grid 40. Zero or more multiplier modifier element 34 may also be generated in tiles of the game grid 40. In the example of FIG. 3*a*, a multiplier modifier element 34 which reads "+2" is located in a tile of a game lane 32 that has a multiplier value 36*a* of 5. FIG. 3*b* shows the same in-game user interface 30 as in FIG. 3*a*, wherein the multiplier modifier element 34 has been applied to the multiplier block of the associated game lane. That is, in FIG. 3*b* the multiplier value 36*a* has been modified by the amount indicated in the applied modifier element 34, changing value 36*a* to multiplier value 36*b*, having a value of 7.

Note that frequency of generation and the amount by which a multiplier modifier element 34 increments the multiplier block 14 may differ between game lanes 32, being dependent on the multiplier associated with each game lane 32. In other embodiments, there may be a uniform probability distribution of multiplier modifier elements 34 in the multiplier modification phase of the gameplay sequence. In yet other embodiments, a multiplier modification phase may not be implemented.

Figure 4:
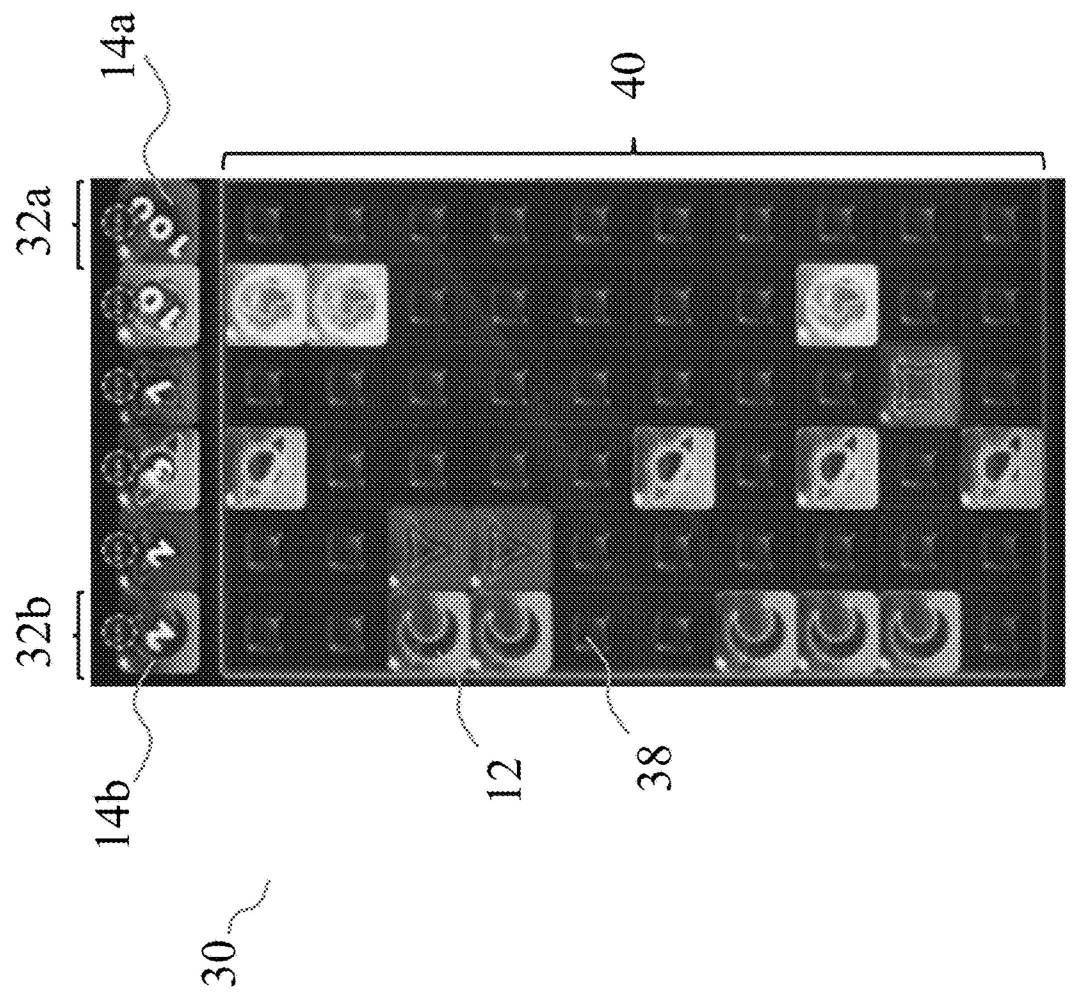
FIG. 4 shows an in-game user interface on which a first game block cascade event of a gameplay sequence is occurring.

With reference now to FIG. 4, a multiplier modification phase may be followed by one or more iteration of a cascade population phase, wherein a quantity of prize elements 12 of each type are generated in their respective game lanes 32 on the game grid 40. Although systems of generating prize elements 12 in tiles of each game lane 32 are discussed in more detail later, it will be appreciated that in a cascade phase, a determination of whether to populate a tile with either an appropriate prize element 12 or a Null block 38 may be made for each tile in each game lane 32. That is, any tile in which no prize element 12 is generated may instead be populated with a Null block 38. Following the generation of prize elements 12 and Null blocks 38 in the cascade population phase, the null blocks may be removed from the game grid, and a gravity game mechanic may cause the remaining prize elements to "fall" to the bottom of their respective game lanes 32 and stack vertically in the tiles of the game grid 40, as shown in FIG. 5.

As discussed previously, a phased reveal of the bet outcome may improve user engagement and excitement within the game. When prize elements 12 and Null blocks 38 are both present on the game grid 40, it is not immediately clear to what extent each game lane 32 is filled with associated prize elements 12. Once the Null blocks 38 are removed and the prize elements 12 are stacked it becomes much clearer visually, particularly in terms of relative extents of completion in each game lane 12. The user may be more excited by the outcome of the gameplay sequence when they see animated progress towards their desired outcome, as is provided in the cascade population phases.

Figure 5:
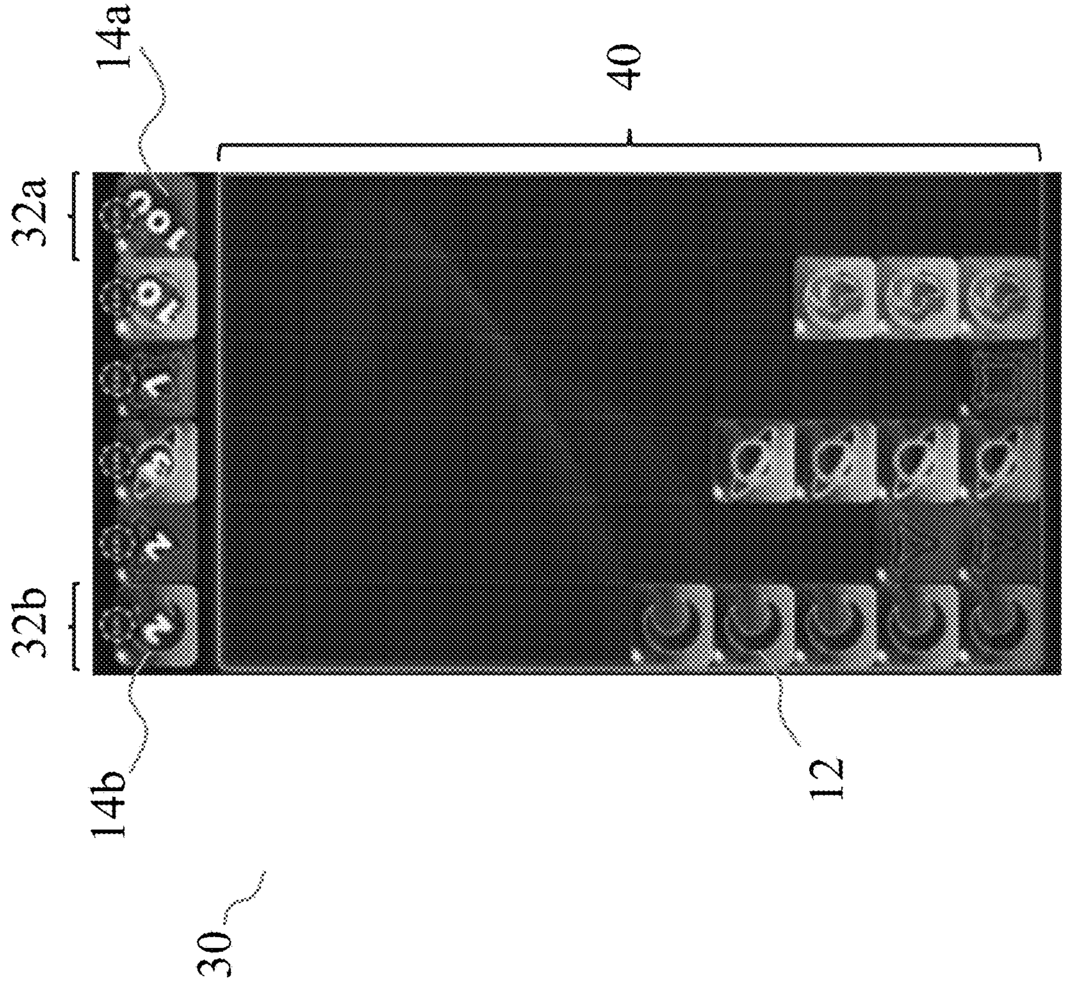
FIG. 5 shows the user interface of FIG. 4, wherein null blocks of the first cascade are removed.
Figure 6:
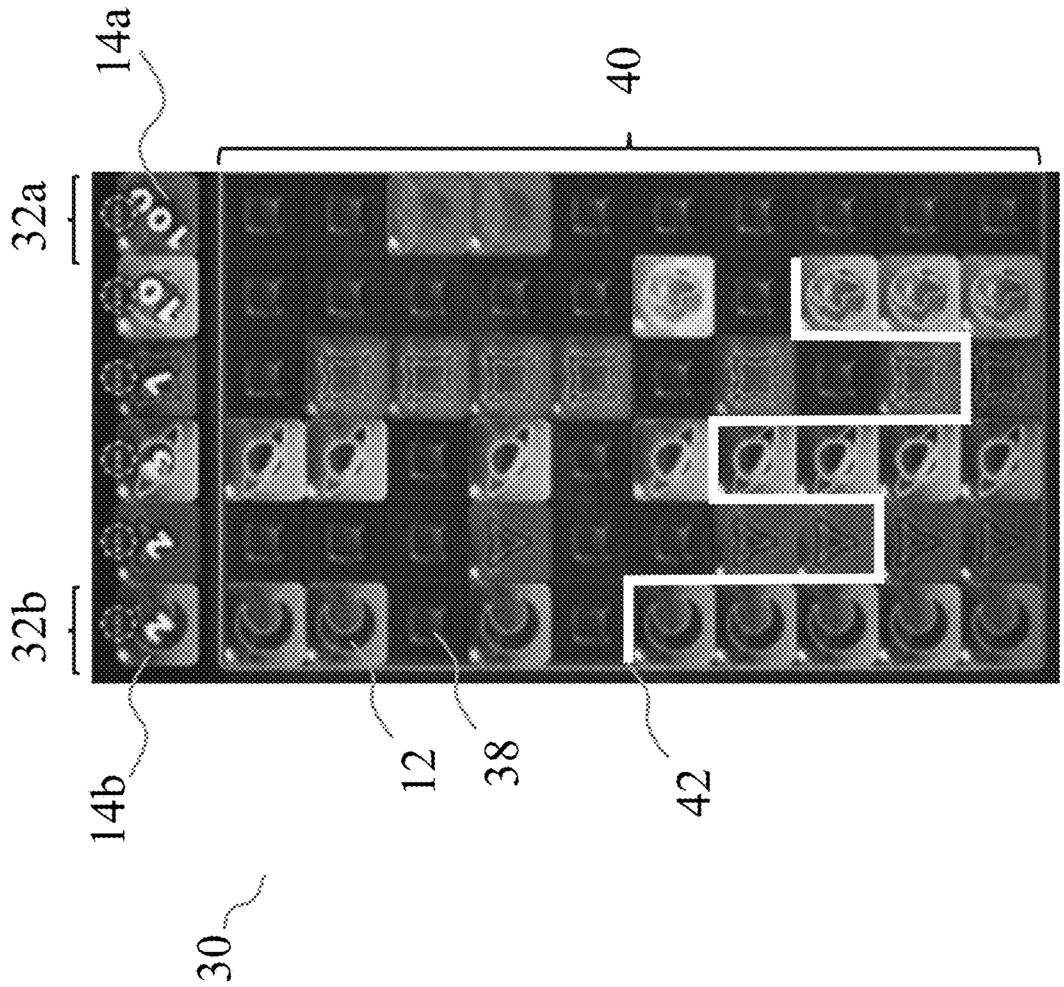
FIG. 6 shows an in-game user interface on which a second game block cascade is occurring.
Figure 7:
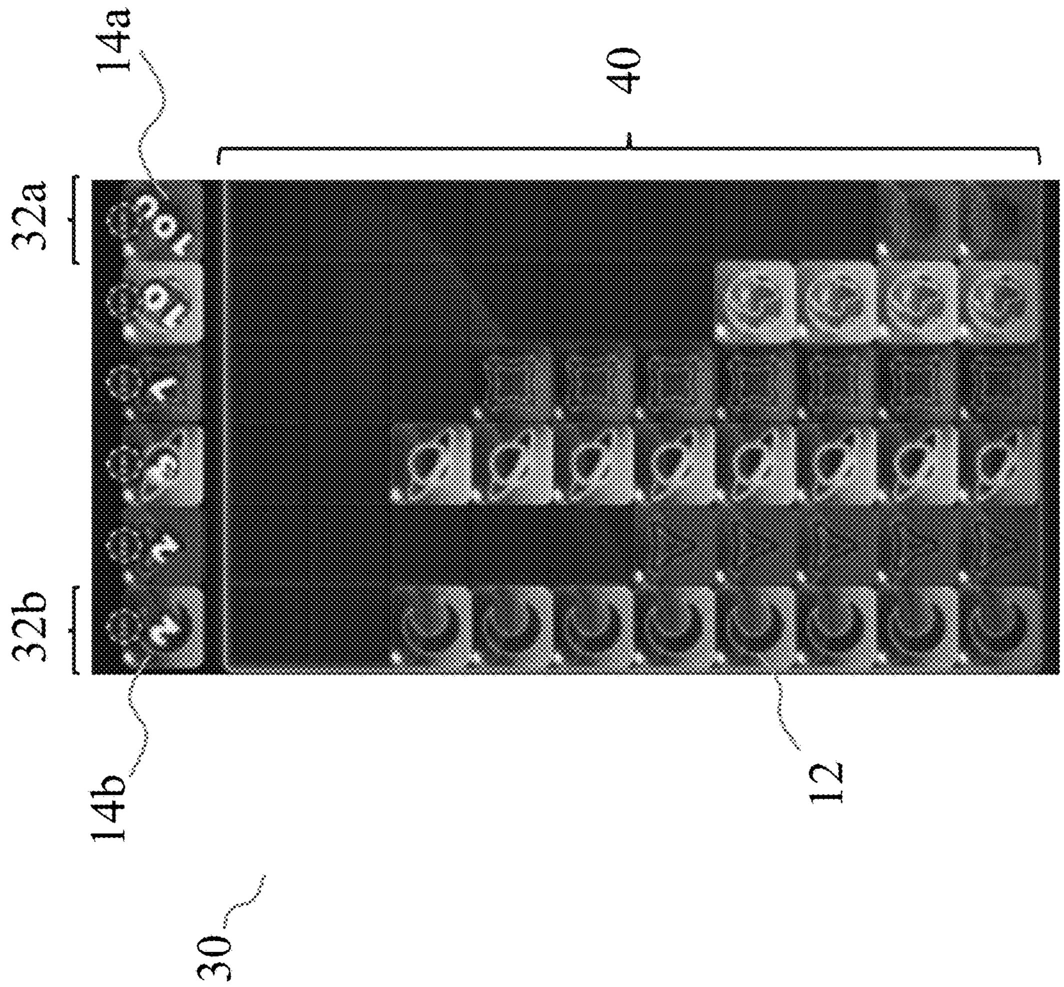
FIG. 7 shows the user interface of FIG. 6, wherein null blocks of the second cascade are removed.

FIGS. 6 and 7 show the same in-game UI 30 and game grid 40 as in FIGS. 3-5, wherein a second iteration of a cascade population phase is occurring. In FIG. 6, the determination of whether to populate a tile with an appropriate prize element 12 or a Null block is made only for the tiles which remain empty after the Null blocks 38 of the previous iteration are removed. For example, FIG. 6 shows an iteration boundary 42, which is not part of the in-game UI 30, but shows the point on the game grid 40 above which prize elements 12 and Null blocks 38 were generated in the second cascade phase iteration. Note that no prize elements 12 were generated in the game lane 32*a* in the first cascade iteration (shown in FIG. 4). FIG. 7 shows the same in-game UI 30 as in FIG. 6, wherein the Null blocks of the second cascade iteration are removed, and the newly generated prize elements 12 are stacked vertically on the game grid 40.

One or more further cascade population phase may be implemented. That is, although two iterations have been described with reference to FIGS. 4-7, more or fewer iterations may be performed in practice. For example, cascade phases may be performed until one or more game lane has a threshold number of associated prize elements 12 therein.

Figure 8B:
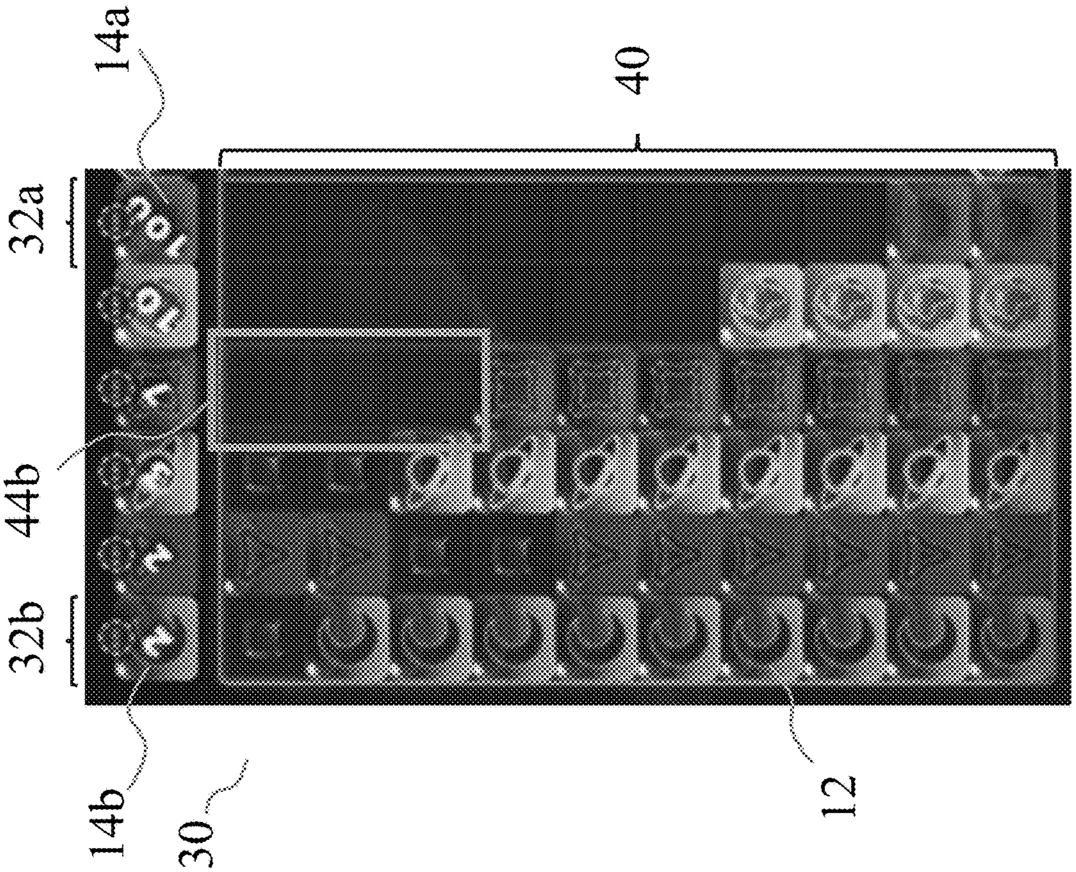
FIG. 8*b* shows the user interface of FIG. 8*a*, wherein a second lane-specific generation of game blocks is occurring at a second game lane.
Figure 8A:
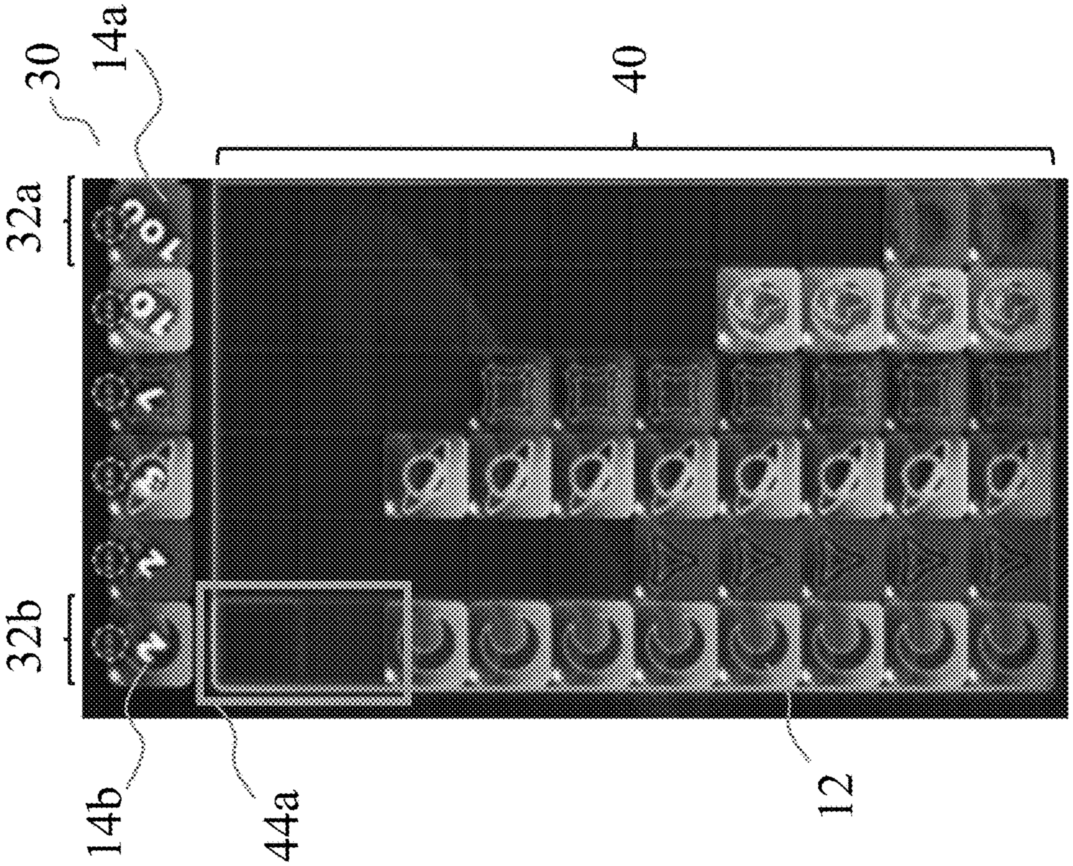
FIG. 8*a* shows an in-game user interface displaying a lane-specific generation of game blocks at a first game lane.

FIGS. 8*a* and 8*b* show a second type of game grid population phase: a lane-by-lane population phase. This phase is shown in FIGS. 8*a* and 8*b* to follow from the cascade phase of FIGS. 6 and 7. Lane-by-lane population of the game grid 40 may involve generating prize elements 12 and Null blocks 38 in the same way as in the cascade phase. However, display of the generated elements on the UI 30 may be staggered by game lane 32 and may include further graphical animations. User engagement and excitement may be further improved by switching from a cascade population phase to a lane-by-lane phase when one or more game lane 32 is near full (either when a game lane 32 has reached a threshold completion level, or after a predetermined number of cascade phase iterations). That is, a lane-by-lane population phase draws user attention to one column at a time and increases anticipation for the outcome at the end of the gameplay sequence. The in-game UI of FIG. 8*a* include a graphical flare 44*a* on game lane 32*b*, indicating that game lane 32*b* is to be populated with prize elements 12 and/or Null blocks 38. Similarly, FIG. 8*b* shows a second graphical flare 44*b* on a second game lane on the game grid 40.

It will be appreciated that lane-by-lane population phases may not be implemented. Alternatively, a lane-by-lane generation of elements may only be displayed on game lanes 32 which are near-complete. Although a lane-by-lane generation of elements on near complete game lanes 32 may increase user anticipation for the outcome, doing the same on game lanes 32 which are far from completion may not have the same emotional effect on the user.

Game lane generation probabilities may be dynamic, and may change during the gameplay sequence. In some examples, the generation probability of a particular game lane may be modified when that lane comprises a threshold quantity of prize elements. The lane-by-lane generation phase and the above-described modification of game lane generation probabilities may both be dependent on reaching a threshold quantity of prize elements; implementation of the lane-by-lane generation phases may therefore coincide with a modification of element generation probability in one or more game lane. Dynamic element generation probabilities are described in more detail later.

Figure 9:
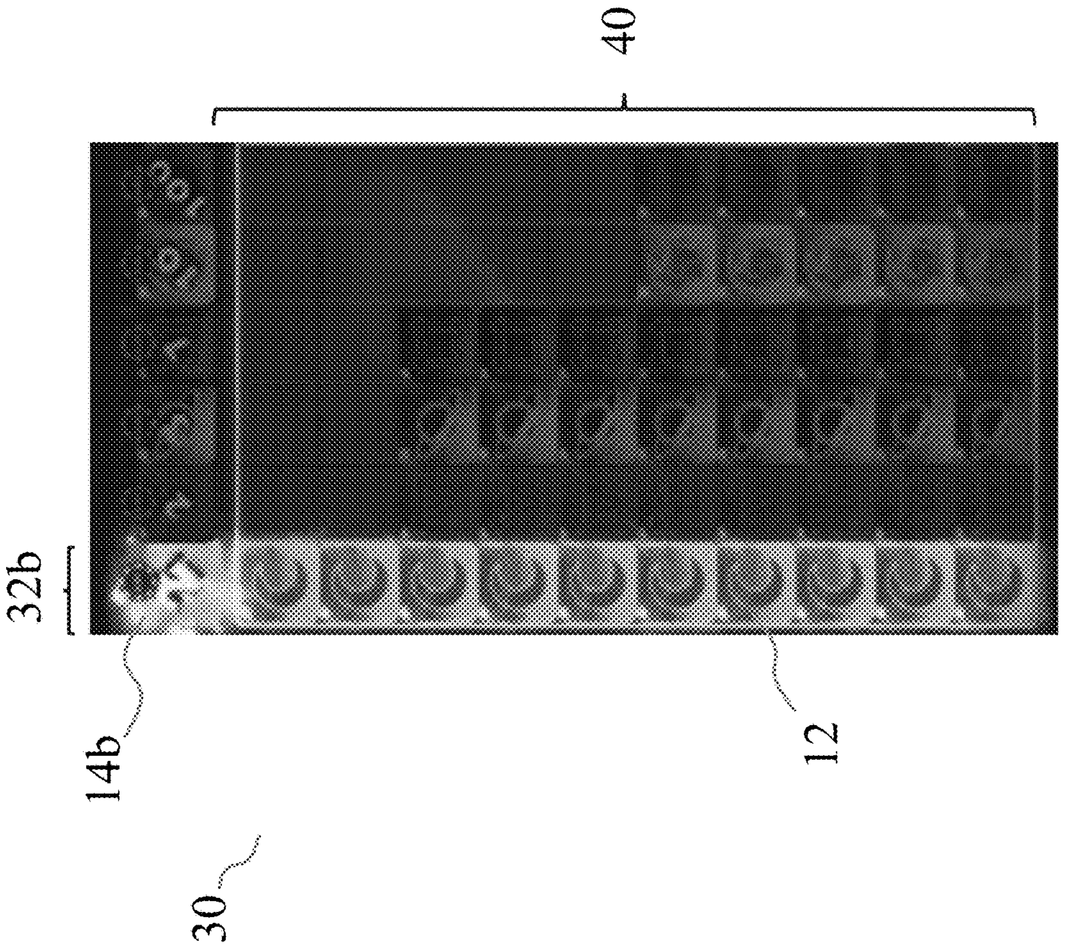
FIG. 9 shows an in-game user interface displaying an animation caused by completion of a game lane.
Figure 10:
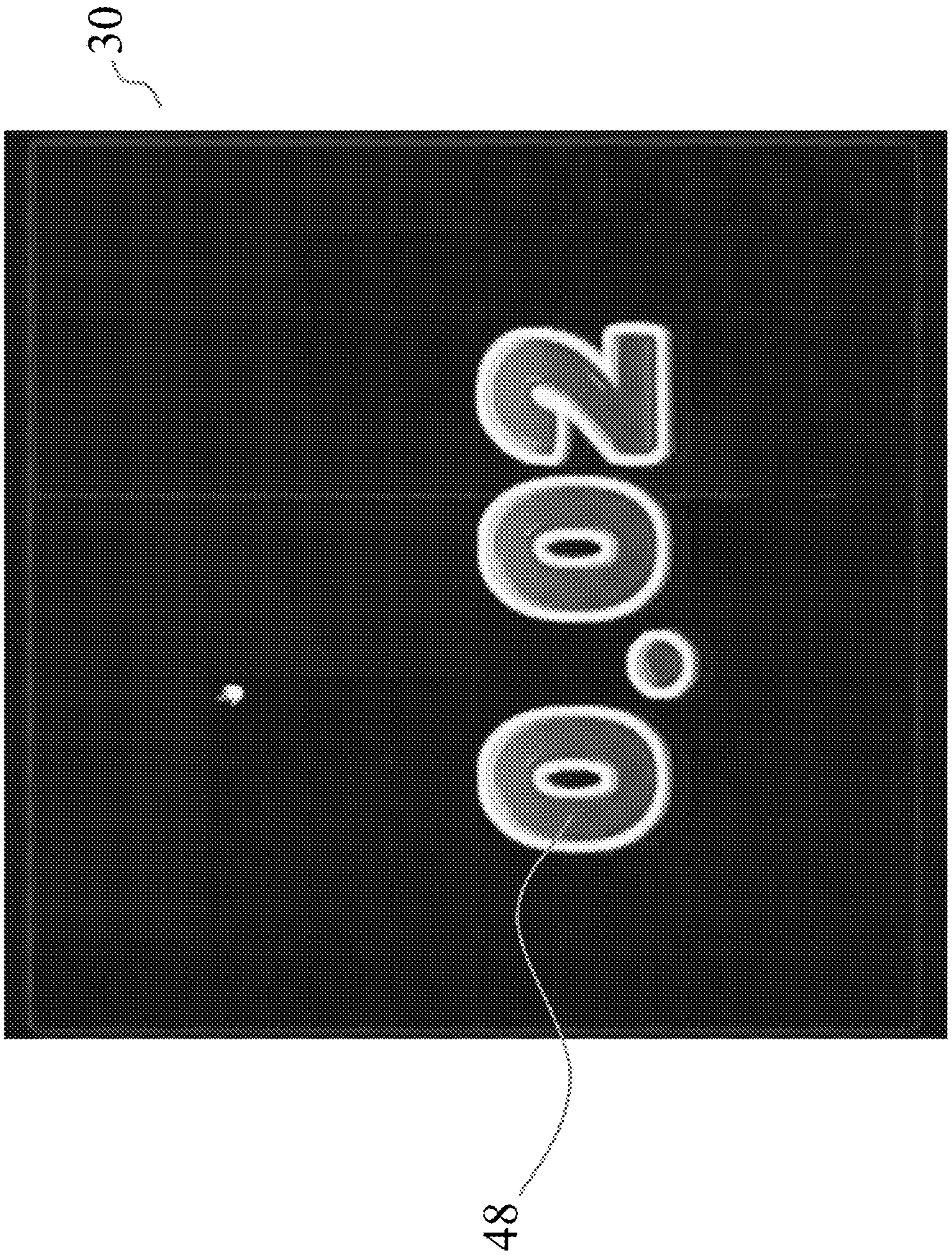
FIG. 10 shows a user interface on which a result of the gameplay sequence is displayed.

FIG. 9 shows an exemplary animation on the game grid 40 of the in-game UI 30, triggered by completion of game lane 32*b*. In the exemplary animation of FIG. 9, the prize elements 12 of the completed game lane 32*b* appear visually brighter than prize elements of other game lanes. A visual flare on the winning game lane 32*b* may also be displayed. FIG. 9 provides an example of how a gameplay sequence outcome may be displayed to a user. FIG. 10 shows a graphical overlay 48 on the surface of the in-game UI 30, which displays to the user the outcome of their bet, in view of the outcome of the gameplay sequence. That is, if one or more of the prize elements 12 selected by the user is a winning prize element 12, the graphical overlay may display an amount of tokens units won by the user. Alternatively, the graphical overlay 48 may display a message such as, "better luck next time" etc. if the user's selection is not realised.

As described previously, the probability of completing a particular game lane during a gameplay sequence may be inversely proportional to a multiplier value associated with the particular game lane. That is, game lanes with higher-value multipliers may be winning game lanes less frequently than those with lower-value multipliers. However, element generation probabilities may be dynamic during a game sequence. That is, from a macroscopic (gameplay sequence-level) perspective, the probability of a particular game lane being a winning game lane may be constant, relative to other game lanes—e.g., a game lane having a multiplier of 100 may be fifty times less likely to be a winning lane than a game lane with a multiplier of 2, over a whole gameplay sequence. However, it will be appreciated that prize elements may be generated with varying probability at different times within a gameplay sequence, both in terms of absolute probability and relative probability between game lanes. It is the average relative generation probability that remains constant.

In addition to average relative generation probabilities, the win probability of each lane also depends on the height of the game grid. For example, consider a grid having two exemplary game lanes and an n-high game grid. The relative win probabilities of the two lanes may be configured such that a first lane wins x times as frequently as a second game lane. Additional flexibility is provided by associating multiple block generation probabilities with each game lane, where the overall probability of a win outcome on a given game lane is ultimately determined by all the block generation probabilities associated with it, and the manner in which they are applied.

Element generation probabilities in each game lane may change during a gameplay sequence. In some embodiments, an initial element generation probability may be implemented in each game lane until that game lane comprises an intermediate threshold number of prize elements. When a particular lane reaches the intermediate threshold, the lane may switch to a second element generation probability. In the examples shown in the figures, the intermediate threshold is 7 tiles in a 10-tile high grid (the final threshold being 10).

In such an example, the first seven elements generated in each game lane may be generated according to the initial element generation probability for that lane. The remaining three tiles in each game lane may be generated according to the second element generation probability for that lane. However, as described previously, the overall relative win probability of each game lane is conserved by tuning the first and second probabilities accordingly. This enables game lanes having high-value multipliers to have a high initial generation probability, but still exhibit a reasonably high rate of block generation in the early stages of the game. However, a second element generation probability of such a game lane may be sufficiently low that the overall win probability of that lane is consistent with the relative win probability of that game lane, and thus the value of its associated multiplier.

Different combinations of first and second probabilities on a given lane can provide the same overall probability of a win outcome, but with different effects levels of visual activity in that game lane over the course of the game play sequence.

In addition, the visual mechanism used to populate game lanes may change with the block generation probability upon reaching the intermediate threshold.

In the depicted examples, prior to any game lane reaching the intermediate threshold, all grid cells in a game lane are populated (with game blocks/null elements) essentially simultaneously. Moreover, all game lanes are. However, if and when a given lane reached the intermediate threshold, in subsequent iteration(s), the game lanes and their remaining grid cells may be populated in a more staggered fashion.

Once a game lane has reached in subsequent iterations, each subsequent iteration will ‘pause’ on that game lane, before moving onto the remaining game lanes (from left to right in the depicted examples).

In one example, it is decided based on the new (second) lane generation probability whether to populate the next empty grid cell with a game block or a null element. If a game block is selected, the GUI is updated to populate that cell only (with a game block). However, if a null element is selected, the grid cell is instead visually populated simultaneously with at least one other grid cell in the lane.

Figure 8C:
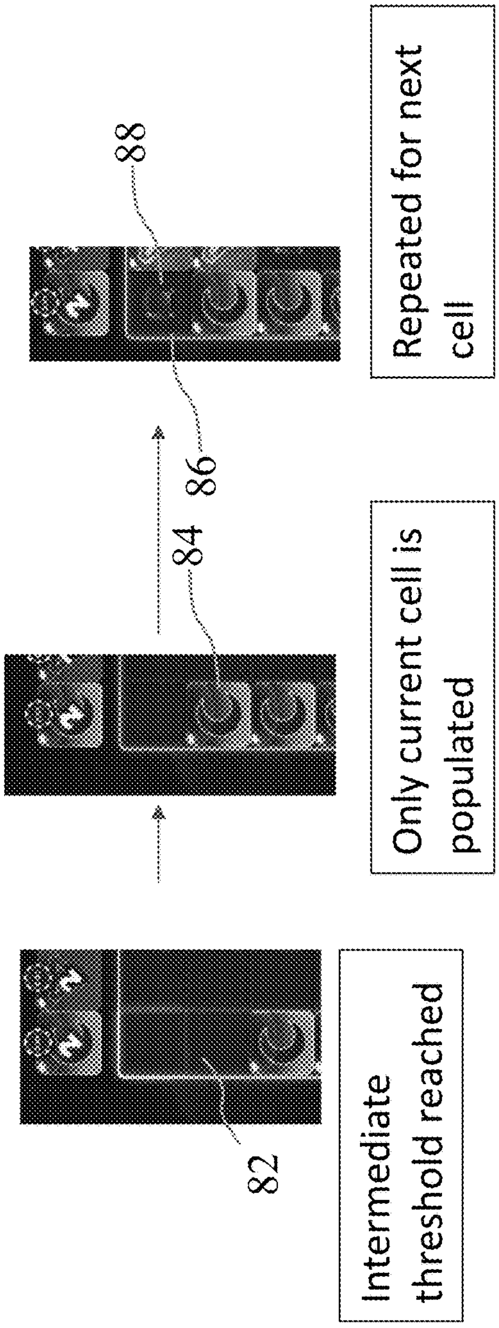
FIG. 8*c* shows a first example outcome once an intermediate game block threshold has been reached for a first game lane.

FIG. 8*c* shows one possible outcome for a game lane that has exceeded the intermediate threshold in the previous iteration. The first empty grid cell 82 in the array is considered. In this case, it is decided to populate the next grid cell with a game block 84. Because a game block, rather than a null element has been selected, the GUI is updated to populate only that grid cell 82 with the game block. This proved then continues for the next tile 86 (still within the same iteration), where a decision is made, again based on the second block generation probability, as to whether to populate that cell with a null element or a game block. In this case, the next grid cell 86 is the final tile in the array, and the outcome happens to be the selection of a null element 88 (this could, alternatively, have been a game block, in which case the game play sequence would end once the current iteration has completed across all game lanes). The final grid cell 86 is thus populated with the null element 88, which is then removed, and the iteration moves to the next lane (all game blocks in the lane having been considered at this point).

Figure 8D:
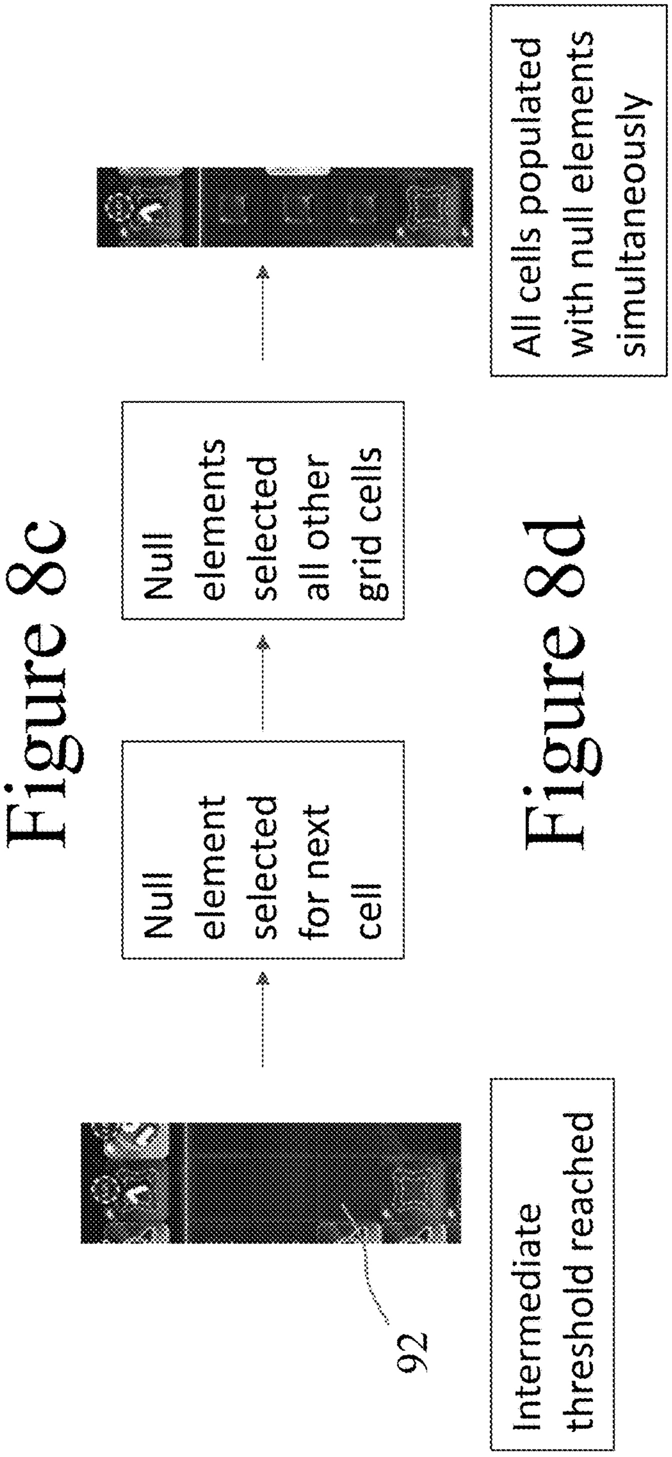
FIG. 8*d* shows a second example outcome once an intermediate game block threshold has been reached for a second game lane.

FIG. 8*d* shows an alternative outcome on another game lane that has reached the threshold. In this case, a null element is selected for the next empty grid element 92. Null elements are also selected for the remaining game tiles, and all of the remaining game tiles are updated simultaneously in the GUI.

The probability of generating a game block in a given tile may or may not be independent of the other game tiles. For example, in one implementation, if a null element is selected for the next tile based on the second block generation probability, then null elements may be selected for all other game elements with probability one (implying that, after the intermediate threshold has been reached, a game block can never be generated after a null element in the array). Alternatively, each remaining grid cell may be considered independently, as in the first stage prior to reaching the intermediate threshold (but based on the second probability rather than the first).

An exemplary game sequence, as illustrated in FIGS. 1-10, is now described with reference to FIG. 11. The flowchart of FIG. 11 begins at a step S1, wherein a user selects one or more game lane and a token quantity to assign to the one or more game lane. At a step S3, the user selects to initiate the gameplay sequence. Note that step S3 may correspond to user selection of the play button 20 on the UI 10 of FIG. 2. At a step S5, an initiation event may occur, in which zero or more multiplier modifying element 34 may be generated.

The flow may then progress to step S7, wherein a cascade phase of the gameplay sequence occurs. At the end of the cascade phase in step S7 a determination may be made, in a step S9, as to whether an end condition for cascade phases in the gameplay sequence is satisfied. That is, one or more cascade phase may be implemented until a condition is satisfied, such as a predetermined number of cascade phase iterations, or a threshold height of prize elements in one or more game lane. If at step S9 it is determined that the cascade condition is not satisfied, the flow may return to step S7, in which another cascade phase is implemented. Cascade phases may be repeated until the cascade condition is satisfied, after which the flow progresses to a step S11.

Figure 11:
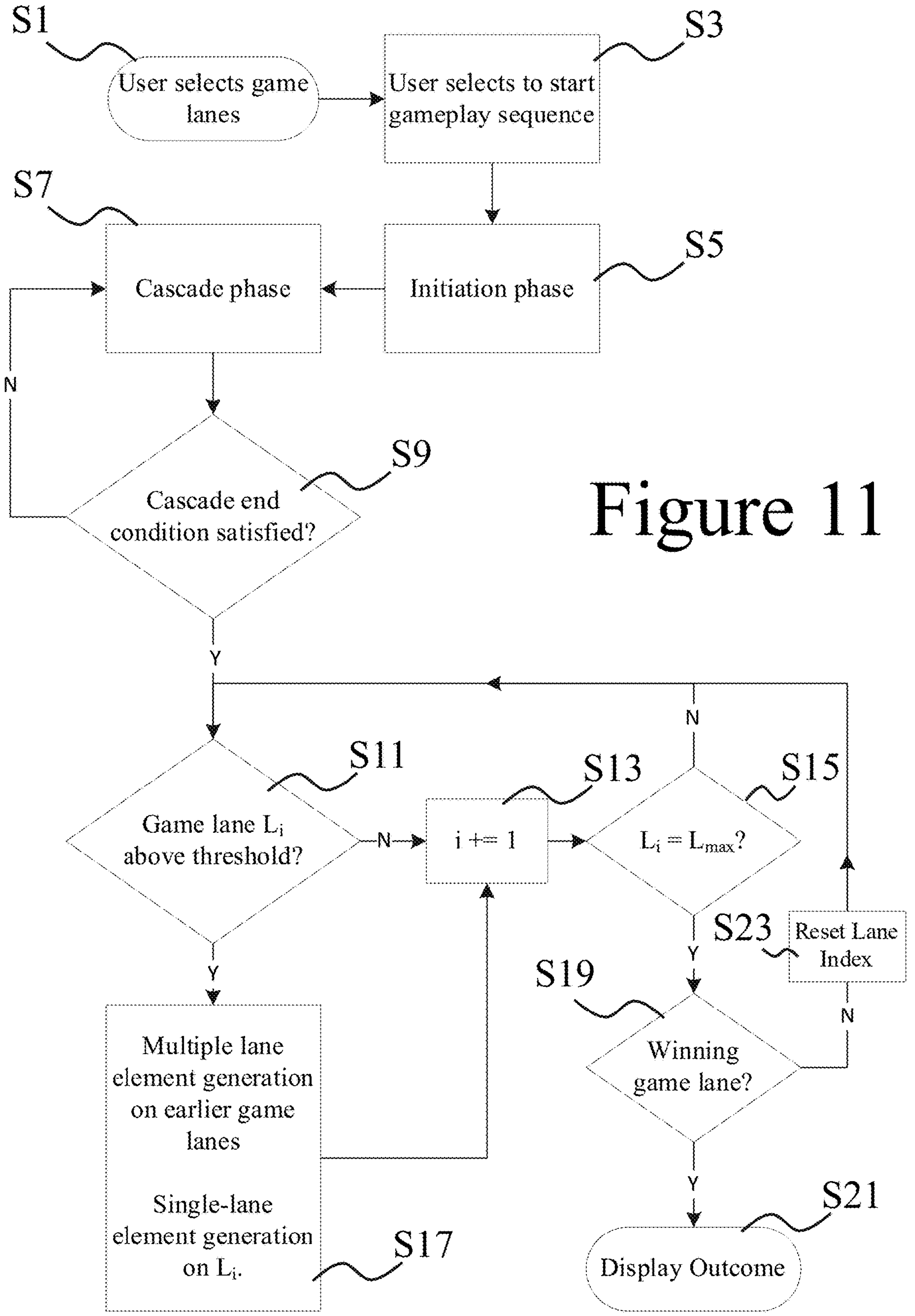
FIG. 11 shows a flowchart for a method of implementing a game mechanic.

In the example of FIG. 11, it is assumed that a lane-by-lane generation of elements is only implemented in game lanes which comprise a number of associated prize elements that is greater than a predetermined threshold number of prize elements. For example, generation of elements on a single-lane basis may only be implemented on game lanes comprising 7 or more corresponding prize elements. Note that other thresholds may be applied. At step S11, a determination is made as to whether a first game lane, having a first lane index $L_i$, comprises a number of prize elements that is greater than a threshold number of prize elements. If the determination at step S11 returns FALSE, the flow may progress to a step S13, wherein the game lane index to be queried is incremented by one (e.g., so that the number of prize elements in the next game lane in the game grid may be queried against the threshold).

At a step S15, a determination is made of whether the incremented lane index (incremented at step S13) is a maximum lane index, and indicates that all game lanes in the grid have been queried. If the query at step S15 returns FALSE, the flow may return to step S11, in which the game lane having the newly incremented lane index is queried against the prize element threshold. At the highest level, the loop formed between steps S11, S13 and S15 represents an iterative, lane-by-lane query of the number of elements in each game lane in the game grid to identify lanes having an above-threshold number of prize elements. One or more lane-by-lane phase of prize element generation may be performed, each instance of the lane-by-lane phase corresponding to an iterative pass over all lane indices.

If, at an instance of step S11, the query returns TRUE, a single-lane generation of prize elements may be implemented on the game lane that corresponds to the queried lane index. This step is denoted S17 in FIG. 11. Note that when a game lane that comprises an above-threshold number of prize elements is identified, one or more lower index game lane may have been queried at S11, returned FALSE and passed over, having not had prize elements generated therein. Upon identifying a lane comprising an above-threshold number of prize elements, prize element generation may be performed on the one or more lower index game lanes simultaneously, before single-lane element generation is performed on the above-threshold game lane.

S17 may be followed by an increment of lane index at step S13, then a determination of whether the newly incremented lane index is a maximum lane index may be made at step S15. If S15 returns TRUE, the flow may progress to a step S19, wherein the game grid is queried to determine if any of the game lanes are completely filled with corresponding prize elements. If there are no complete game lanes, the flow may progress to a step S23, wherein the lane index to be queried is reset. Step S23 marks the start of a new lane-by-lane element generation phase, i.e., a second pass over each lane index according to steps S11-S19. If at step S19, it is determined that one or more game lane is complete, the flow continues to step S21, wherein the outcome of the gameplay sequence is displayed on the UI of the computing device.

An additional game mechanic, which may be implemented upon completion of a "bonus" game lane, is now described. Reference is made to FIG. 1, in particular to the bonus multiplier block denoted by reference numeral 14*d*. Though not shown in the example of FIGS. 3-10, a game lane in the in-game UI 30 may be provided for each of the exemplary bonus multiplier blocks shown in FIG. 1. Each bonus game lane has an associated overall win probability, and may be filled according to the same game mechanic as is described with reference to FIGS. 4-10. However, one or more of the bonus game lanes may be further associated with an additional game mechanic, which is triggered when that bonus game lane is selected by the user and is a winning game lane after a gameplay sequence. A bet may be placed on a bonus lane in the same manner within the set-up view. If an instant win is obtained on a game lane, the amount of tokens won by the player on the bonus is dependent on the bet size placed on that bonus lane.

The following game mechanic may be implemented for a game lane corresponding to the bonus multiplier block 14*d* of FIG. 1. If, at the end of a gameplay sequence, the game lane corresponding to the bonus block 14*d* was selected and is a winning game lane, a wheel comprising a plurality of portions may be displayed, each portion comprising a number between 1 and a value X. Note that the value X may not be the same number as the number of portions on the wheel. The wheel may be shown to be spun, and to stop such that an arrow or other indicator on the UI points to a particular portion of the wheel. The number associated with the selected portion of the wheel is selected.

A bonus game grid having X game lanes may then be provided. In the following example X=5, though other values may be used in practice. The number selected by spinning the wheel indicates a number of game lanes that are to be filled in the bonus game grid. The same element generation mechanic as is described with reference to FIGS. 4-10 may then be implemented. However, the end condition may be modified, such that the bonus grid is populated with game elements until the selected number of game lanes is filled.

Upon filling the selected number of game lanes, the user may receive multipliers and or instant prizes associated with the selected number of filled game lanes in the bonus grid. Note that since a higher number of game lanes to be filled enables a higher-value return, the probability of selecting a particular number on the wheel may be inversely proportional to the magnitude of that value. It will also be appreciated that when the bonus grid is provided, each game lane may have an associated relative win probability, dependent on the value of the associated multiplier or instant win.

Figure 12:
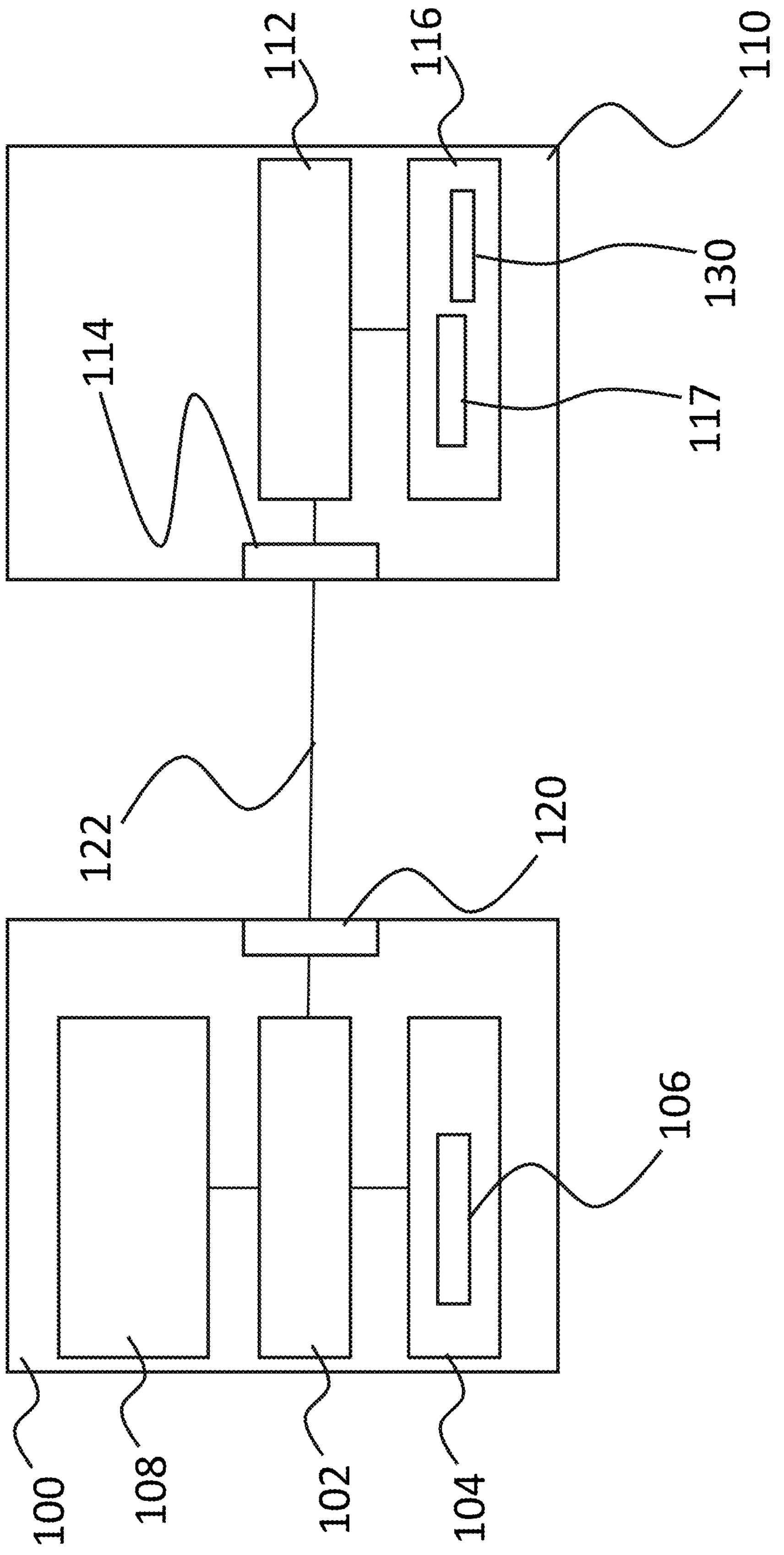
FIG. 12 shows a schematic block diagram of a gameplay system.

FIG. 12 shows an example system architecture for implementing the method. The system comprises a user device 100, such as a smartphone, tablet, personal computer, wearable device etc, in communication with a server 110. Whilst a single server 110 is shown, the functions of the server 110 may be carried out by multiple servers in cooperation. The user device 100 and server 110 are equipped with respective network interfaces 120, 114 to facilitate communication between them via a network 112 (or networks).

The user device 100 is shown to comprise a processor (or processors) 102, such as a CPU, and a memory 104 coupled to the processor 102. The memory 104 holds a computer program in the form of a game client 106 for execution on the processor 102. The processor 102 is coupled to a display 108 (or displays) to enable the processor 102 to control the display 108to render a graphical user interface.

The server 110 is sown to comprise one or more processor 112 and a memory 116 in which server code 117 is stored for execution on the processor 112. The server code 117 implements the game mechanic described above, and is responsible for determining block/null element outcomes in each game lane, and communicating the results to the client 106 for rendering at the user device 100. Those functions include determining and applying block one or more block generation probabilities for each game lane. The block generation probabilities are generated in the server memory 116, as denoted by block 130.

What is claimed is:

1. A computer-implemented method of rendering a computer game in a graphical user interface, the method comprising implementing, by one or more computer processors, the following operations:

rendering in the graphical user interface a set-up view for selecting one or more game lanes from a set of game lanes;

receiving user input for selecting in the set-up view one of more one or more game lanes of the set of game lanes;

receiving a game initiation input;

rendering in the graphical user interface a gameplay sequence, by randomly populating each game lane with game blocks, until a termination condition is met, based on at least one block generation probability associated with the game lane; and upon termination of the gameplay sequence, determining a gameplay outcome dependent on whether any game lane that was selected in the set-up view has reached a threshold number of game blocks;

wherein each game lane is associated with at least a first block generation probability and a second block generation probability lower than the first block generation probability;

wherein each game lane is randomly populated based initially on the first block generation probability associated with the game lane up to an intermediate number of game blocks, wherein upon a game lane reaching or exceeding the intermediate number of game blocks, the game lane is populated thereafter based on the second block generation probability associated with the game lane, independently of the first block generation probability associated with the game lane; and wherein each game lane is randomly populated initially based on the first block generation probability independently of the second block generation probability.

2. The computer-implemented method of claim 1, wherein the gameplay sequence is rendered based on a sequence of iterations, wherein, for each iteration, a randomized decision is made for each game lane as to how many game blocks to add to the game lane, wherein the termination condition is met upon completion of a final iteration in which at least one game lane has reached the threshold number of game blocks.

3. The method of claim 2, wherein each game lane is formed of an ordered one-dimensional array of grid cells, and each iteration comprises:

for each unpopulated grid cell of each game lane, randomly populating the unpopulated grid cell with one of a game block and a null element, for any grid cell that is populated with a null element, removing the null element from the grid cell, for any grid cell that is populated with a game block and preceded by one or more unpopulated grid cells as a result of removing one or more null elements, moving the game block to a preceding grid cell in the one-dimensional array that is unpopulated and immediately preceded by a grid cell populated with a game block, thereby forming a single contiguous sequence of game blocks in the game lane.

4. The method of claim 3 wherein each game lane is randomly populated initially based on the first block generation probability independently of the second block generation probability, wherein each unpopulated grid cell of each game lane is populated with a game block or a null element in an initial iteration based on the first block generation probability associated with the game lane, wherein, in each subsequent iteration, each unpopulated grid cell of each game lane is populated with a game block or a null element based on:

the first block generation probability associated with the game lane, independently of the second block generation probability associated therewith, in the event the game lane did not reach the intermediate number of blocks in the preceding iteration, and the second block generation probability associated with the game lane, independently of the first block generation probability associated therewith, in the event the game lane reached or exceeded the threshold number of game blocks in the preceding iteration.

5. The method of claim 4, wherein, for any game lane that has not reached the intermediate number of game blocks, all unpopulated grid cells of the game lane are populated substantially simultaneously with game blocks, null elements or a combination of game blocks and null elements, and wherein, for any game lane that has reached the intermediate number of game blocks, the game lane is randomly populated by:

deciding whether to populate each unpopulated grid cell of the game lane with a game block or a null element, wherein:

if it is decided to populate the earliest unpopulated grid cell with a game block, populating that grid cell with a game block on the graphical user interface before populating any other grid cell of that game lane, and if it is decided to populate the earliest unpopulated grid cell with a null element, populating the earliest unpopulated grid cell with a null element on the graphical user interface and populating the next grid cell with a game block or null element substantially simultaneously therewith.

6. The method of claim 5, wherein the set-up view comprises, for at least a subset of the set of game lanes, a multiplier indicator associated with the game lane, wherein a game lane is selected by associating a user-defined token amount with the game lane, the token amount being deducted from a token balance of the computer game, wherein determining the game outcome comprises computing a win amount based on a multiplier value and the user-defined token amount associated with any selected game lane that has reached the threshold number of game blocks.

7. The method of claim 6, wherein the multiplier indicator indicates a minimum multiplier value for the game lane, wherein responsive to the game initiation input and prior to the gameplay sequence, at least one grid cell in at least one game lane of the subset of game lanes is randomly populated with a modification element;

wherein, for any game lane that is populated with at least one modification element, the multiplier value is determined based on the minimum multiplier value and a value of the at least one modification element; and wherein, for any game lane that is not populated with any modification element, the multiplier value is set to the minimum multiplier value indicated in the set-up view.

8. The method of claim 1, wherein the set-up view comprises, for at least a subset of the set of game lanes, a multiplier indicator associated with the game lane, wherein a game lane is selected by associating a user-defined token amount with the game lane, the token amount being deducted from a token balance of the computer game, wherein determining the game outcome comprises computing a win amount based on a multiplier value and the user-defined token amount associated with any selected game lane that has reached the threshold number of game blocks.

9. The method of claim 8, wherein a block generation probability associated with each game lane is inversely related to the multiplier value associated with the game lane.

10. The method of claim 1, wherein at least one bonus game lane is additionally rendered in the graphical user interface, wherein if the bonus game lane has reached the threshold number of game blocks when the termination condition is met, a further gameplay sequence is initiated in response thereto, and wherein the gameplay outcome is dependent on an outcome of the further gameplay sequence and whether any selected game lane has reached the threshold number of game blocks.

11. The method of claim 10, wherein initiation of the further gameplay sequence is dependent on the bonus lane having been selected in the set-up view.

12. The method of claim 1, wherein different game lanes are associated with different block generation probabilities.

13. A computer system comprising:

at least one memory configured to store executable instructions; and at least one hardware processor coupled to the at least one memory, and configured to execute the executable instructions, which upon execution cause the at least one processor to perform operations comprising:

rendering in a graphical user interface a set-up view for selecting one or more game lanes from a set of game lanes;

receiving user input for selecting in the set-up view one of more one or more game lanes of the set of game lanes;

receiving a game initiation input;

rendering in the graphical user interface a gameplay sequence, by randomly populating each game lane with game blocks, until a termination condition is met, based on at least one block generation probability associated with the game lane; and upon termination of the gameplay sequence, determining a gameplay outcome dependent on whether any game lane that was selected in the set-up view has reached a threshold number of game blocks;

wherein the gameplay sequence is rendered based on a sequence of iterations, wherein, for each iteration, a randomized decision is made for each game lane as to how many game blocks to add to the game lane, wherein the termination condition is met upon completion of a final iteration in which at least one game lane has reached the threshold number of game blocks; and wherein each game lane is formed of an ordered one-dimensional array of grid cells, and each iteration comprises:

for each unpopulated grid cell of each game lane, randomly populating the unpopulated grid cell with one of a game block and a null element, for any grid cell that is populated with a null element, removing the null element from the grid cell, for any grid cell that is populated with a game block and preceded by one or more unpopulated grid cells as a result of removing one or more null elements, moving the game block to a preceding grid cell in the one-dimensional array that is unpopulated and immediately preceded by a grid cell populated with a game block, thereby forming a single contiguous sequence of game blocks in the game lane.

14. The computer system of claim 13, wherein each game lane is associated with at least a first block generation probability and a second block generation probability lower than the first block generation probability;

wherein each game lane is randomly populated based initially on the first block generation probability associated with the game lane up to an intermediate number of game blocks, wherein upon a game lane reaching or exceeding the intermediate number of game blocks, the game lane is populated thereafter based on the second block generation probability associated with the game lane, independently of the first block generation probability associated with the game lane.

15. The computer system of claim 14, wherein each game lane is randomly populated initially based on the first block generation probability independently of the second block generation probability.

16. Non-transitory media configured to store executable instructions which, when executed on one or more computer processors, cause the one or more computer processors to implement operations comprising:

rendering in a graphical user interface a set-up view for selecting one or more game lanes from a set of game lanes;

receiving user input for selecting in the set-up view one of more one or more game lanes of the set of game lanes;

receiving a game initiation input;

rendering in the graphical user interface a gameplay sequence, by randomly populating each game lane with game blocks, until a termination condition is met, based on at least one block generation probability associated with the game lane; and upon termination of the gameplay sequence, determining a gameplay outcome dependent on whether any game lane that was selected in the set-up view has reached a threshold number of game blocks;

wherein the set-up view comprises, for at least a subset of the set of game lanes, a multiplier indicator associated with the game lane;

wherein a game lane is selected by associating a user-defined token amount with the game lane, the token amount being deducted from a token balance of the computer game; and wherein determining the game outcome comprises computing a win amount based on a multiplier value and the user-defined token amount associated with any selected game lane that has reached the threshold number of game blocks, wherein a block generation probability associated with each game lane is inversely related to the multiplier value associated with the game lane.

17. Non-transitory media configured to store executable instructions which, when executed on one or more computer processors, cause the one or more computer processors to implement operations comprising:

rendering in a graphical user interface a set-up view for selecting one or more game lanes from a set of game lanes;

receiving user input for selecting in the set-up view one of more one or more game lanes of the set of game lanes;

receiving a game initiation input;

rendering in the graphical user interface a gameplay sequence, by randomly populating each game lane with game blocks, until a termination condition is met, based on at least one block generation probability associated with the game lane; and upon termination of the gameplay sequence, determining a gameplay outcome dependent on whether any game lane that was selected in the set-up view has reached a threshold number of game blocks;

wherein at least one bonus game lane is additionally rendered in the graphical user interface, wherein if the bonus game lane has reached the threshold number of game blocks when the termination condition is met, a further gameplay sequence is initiated in response thereto, and wherein the gameplay outcome is dependent on an outcome of the further gameplay sequence and whether any selected game lane has reached the threshold number of game blocks.

* * * * *